US012715327B2

(12) United States Patent
Goddard et al.

(10) Patent No.: US 12,715,327 B2
(45) Date of Patent: Aug. 25, 2026

(54) ELEVATED VEHICLE CHARGE CABLE SYSTEM

(71) Applicant: RIVIAN IP HOLDINGS, LLC, Plymouth, MI (US)

(72) Inventors: Walter Randall Goddard, Novi, MI (US); David Day Lee, Bloomfield Hills, MI (US); Jeffrey Wei Doong, Redondo Beach, CA (US); Marinus Jacobus Adrianus Kerstens, Mountain Lakes, NJ (US); Ronald A. D'Arcangelo, Florham Park, NJ (US); Brady Hyrum Nielsen, Aurora, CO (US)

(73) Assignee: Rivian IP Holdings, LLC, Plymouth, MI (US)

( * ) Notice: Subject to any disclaimer, the term of this patent is extended or adjusted under 35 U.S.C. 154(b) by 994 days.

(21) Appl. No.: 17/961,361

(22) Filed: Oct. 6, 2022

(65) Prior Publication Data

US 2023/0158909 A1 May 25, 2023

Related U.S. Application Data

(60) Provisional application No. 63/281,529, filed on Nov. 19, 2021.

(51) Int. Cl.
*B60L 53/35* (2019.01)
*B60L 53/16* (2019.01)

(52) U.S. Cl.
CPC ............... *B60L 53/35* (2019.02); *B60L 53/16* (2019.02)

(58) Field of Classification Search
CPC .......... B60L 53/35; B60L 53/16; B60L 53/18; B60L 53/31; B60L 53/30; H02G 11/003
See application file for complete search history.

(56) References Cited

U.S. PATENT DOCUMENTS

| | | | | |
|---|---|---|---|---|
| 2012/0048983 A1* | 3/2012 | Bianco | ................. | H02G 11/003 242/388.9 |
| 2017/0158072 A1* | 6/2017 | Sychov | ................... | B60L 53/36 |
| 2018/0186315 A1* | 7/2018 | Terzis | ..................... | B60L 53/31 |

FOREIGN PATENT DOCUMENTS

| | | | | |
|---|---|---|---|---|
| CN | 107985116 A | 5/2018 | | |
| CN | 210363433 U | 4/2020 | | |
| CN | 214728252 U | 11/2021 | | |
| EP | 3654476 A2 * | 5/2020 | .............. | B60L 53/30 |
| WO | WO-2020201616 A1 * | 10/2020 | ........... | H02G 3/0493 |

OTHER PUBLICATIONS

Machine translation of EP3654476A2 (Year: 2025).*
"Experts Talk: Electric Fleet Charging Infrastructure Design with Sean Everett", retrieved from https://web.archive.org/web/20210330034126/https://www.hdrinc.com/insights/experts-talk-electric-fleet-charging-Infrastructure-design-sean-everett, Mar. 30, 2021, pp. 10.

* cited by examiner

*Primary Examiner* — David V Henze
(74) *Attorney, Agent, or Firm* — HG LAW LLP

(57) ABSTRACT

Apparatuses disclosed herein are, in some example approaches, directed to a charging system for a fleet of vehicles. The charging system may include a gantry structure and a plurality of electrical charging devices mounted to the gantry structure. Each of the charging devices has a charging cable extending downward from the gantry structure, with each charging cable configured to charge one of the vehicles.

20 Claims, 11 Drawing Sheets

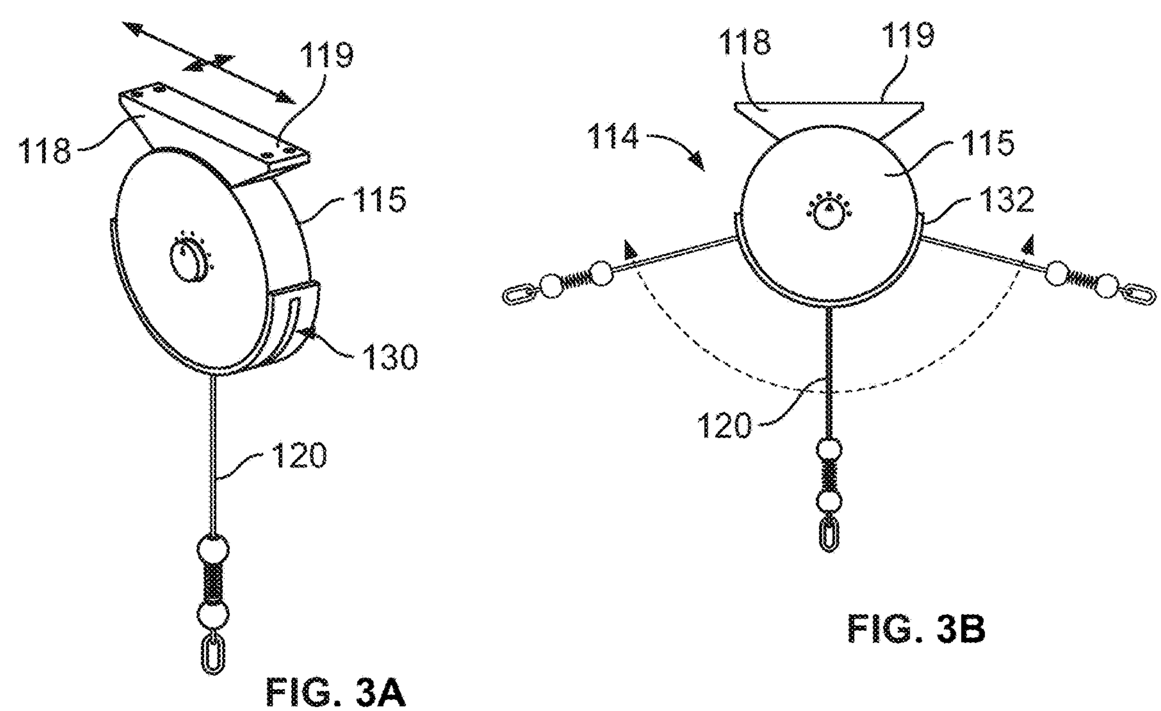
119
118
115
130
120
FIG. 3A
118
119
114
115
132
120
FIG. 3B
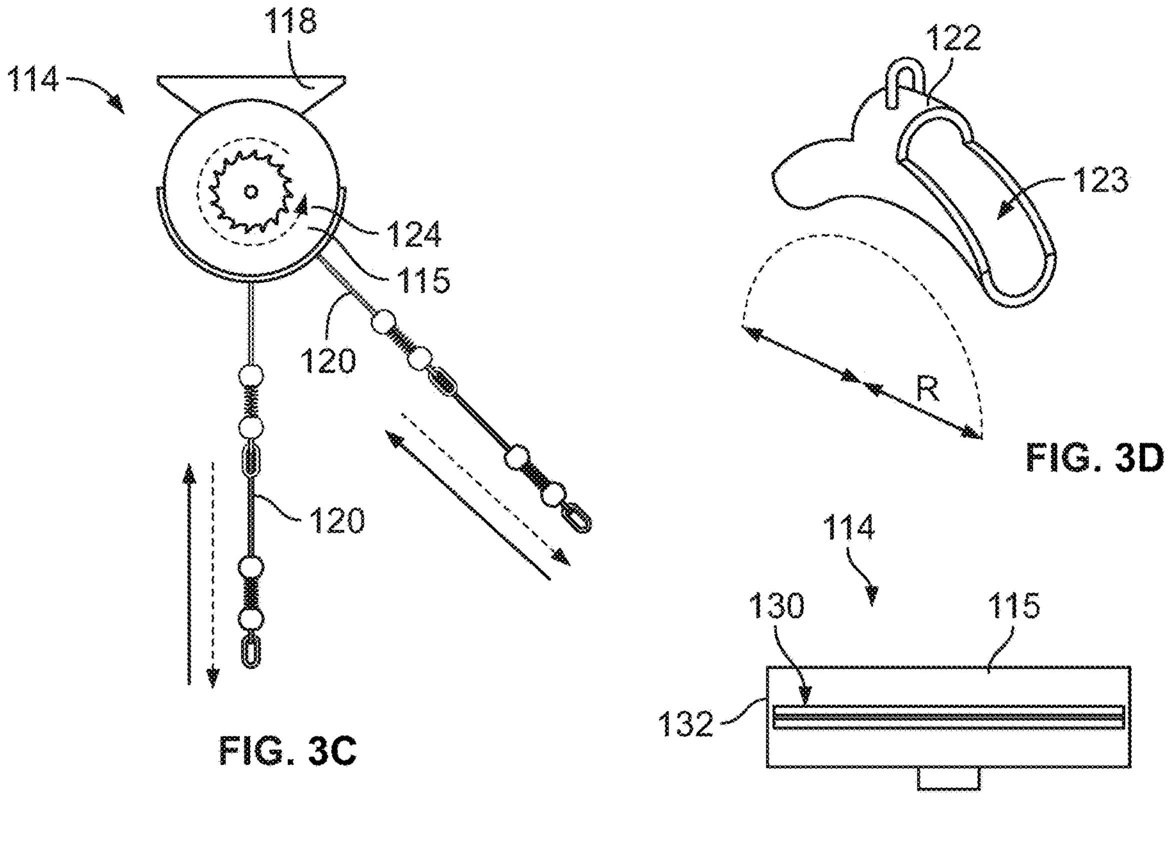
118
114
124
115
120
120
FIG. 3C
122
123
R
FIG. 3D
114
130
115
132
FIG. 3E

ELEVATED VEHICLE CHARGE CABLE SYSTEM

CROSS-REFERENCE TO RELATED APPLICATION

This application claims priority to U.S. Provisional Patent Application No. 63/281,529, filed on Nov. 19, 2021, the contents of which are hereby expressly incorporated by reference in their entirety.

INTRODUCTION

The present disclosure relates to systems for charging vehicles, and more particularly, to systems for charging a fleet of vehicles.

SUMMARY

As electric vehicles are beginning to become available to commercial/fleet operators, a corresponding need has arisen for fleet operators to charge multiple electric vehicles. Presently available charging devices are generally not designed for fleet or commercial operations. Integration-level problems can require non-scalable interventions, and as a result usability, serviceability, and cost of ownership can be compromised.

When it comes to designing fleet charging depots, there are many advantages to installing the charging hardware on overhead structures. Overhead charging structures generally keep infrastructure clutter away from vehicles and personnel on the ground and are modular and scalable. However, there are unique challenges to accessing these benefits due to difficulties associated with managing charging cables. The tight spaces between relatively large commercial vehicles can create the potential for clutter or danger, e.g., from cables lying over vehicles, around walkways for service personnel, etc. Cables may also become damaged from bending, exposure to elements on the ground, or personnel stepping on/around the cable, as examples. Suspended charging cables also may need a flexible "reach radius" to connect to inconsistently located vehicle charge ports, e.g., due to variations of parking practices or vehicle models. Additionally, charging hardware and their accessories mounted on high structures need to be securely implemented, and easy to install and service. Each of these challenges is magnified when considering using higher power charging, which generally requires thicker and or more complex cables to facilitate higher/faster power transfer. Failure to manage these issues can result in frequent hardware servicing, a compromise between ergonomics and serviceability, inefficiencies due to non-standardized servicing practices, extended downtime (and corresponding loss of revenue to fleet operators), and compromised components or other equipment. Accordingly, the example illustrations herein address one or more of the above shortcomings.

In at least some example illustrations, a charging system is provided comprising a gantry structure and a plurality of electrical charging devices mounted to the gantry structure. Each of the electrical charging devices has a charging cable extending downward from the gantry structure, with each charging cable configured to charge a vehicle.

In at least some examples, the charging system further includes a retractor configured to support one of the charging cables at an elevated position and a lowered position, wherein the one charging cable is positioned for charging one of the vehicle at the lowered position.

In at least some examples, the charging system includes a track extending from the gantry structure, wherein the retractor is configured to move along the track.

In at least some example approaches, the track is angled relative to a horizontal direction, such that the trolley is biased toward an end of the track.

In at least some example approaches, the track extends laterally from the gantry structure in a direction parallel to a vehicle movement direction through a charging area of the one of the electrical charging devices.

In at least some example illustrations, the charging system further includes a cable stabilizer mounted to one of the electrical charging devices, the charging cable of the one charging device extending downward from the one electrical charging device within the cable stabilizer.

The cable stabilizer may, in at least some examples, include a partial tube laterally supporting the charging cable below the electrical charging device.

In at least some example illustrations, the charging system also includes a saddle configured to support the charging cable of one of the electrical charging devices below the one electrical charging device.

In at least some example illustrations, the saddle defines a support surface for the charging cable having a support radius greater than a minimum bend radius of the charging cable.

In at least some examples, the charging system includes a support cord of the saddle configured to move the saddle vertically, which is laterally spaced from the charging cable such that charging cable is looped to define a plane.

In at least some examples, the plane is aligned parallel to a vehicle movement direction through a charging area of the one of the charging devices.

In at least some example approaches, the charging system further includes a mounting system securing one of the electrical charging devices to the gantry structure. The mounting system may comprise a front plate configured to be mounted to a wall structure.

In at least some example illustrations, the mounting system comprises a plurality of modular components.

In at least some examples, the electrical charging devices are configured to supply a direct current via a respective charging cable.

In at least some examples, a charging system includes a gantry structure and an electrical charging device mounted to the gantry structure. The charging system further includes a charging cable extending downward from the gantry structure, with the charging cable configured to charge a vehicle. The charging system may further include a retractor configured to support the charging cable at an elevated position and a lowered position, wherein the charging cable is positioned for charging the vehicle at the lowered position. The charging system may also include a saddle configured to support the charging cable below the electrical charging device. The retractor may be configured to raise and lower the saddle. The saddle may also define a support surface for the charging cable having a support radius greater than a minimum bend radius of the charging cable.

In at least some example illustrations, the charging system further includes a support cord of the saddle that is laterally spaced from the charging cable such that charging cable is looped to define a plane. For example, the plane may be aligned parallel to a vehicle movement direction through a charging area of the electrical charging device.

In at least some example approaches, a charging system comprises a gantry structure and an electrical charging device mounted to the gantry structure. The charging system may also include a charging cable extending downward from the gantry structure that is configured to charge a vehicle. The charging system may further include a cable stabilizer, the charging cable extending downward from the electrical charging device within the cable stabilizer. The charging system may also include a stationary saddle configured to support the charging cable below the electrical charging device, wherein the stationary saddle defines a support surface for the charging cable having a support radius greater than a minimum bend radius of the charging cable.

In at least some examples, the stationary saddle is laterally spaced from the charging cable such that charging cable is looped to define a plane.

In at least some example approaches, the plane is aligned parallel to a vehicle movement direction through a charging area of the electrical charging device.

In at least some example approaches, a retractor for a charging cable is provided comprising a base configured to be positioned above a charging location, and a retractable support cord extending from the base to a saddle. The support cord may be configured to extend toward the charging location and retract toward the base. The retractor may further include a ratchet brake configured to position the saddle at a plurality of positions between the base and the charging location.

In at least some examples, the retractor also comprises a track configured to be mounted to a gantry structure, with the base being movably mounted to the track.

In at least some example approaches, a modular mounting system for a charging device comprises a front plate configured to support the charging device in an elevated position, and a top panel. The modular mounting system may be configured to be mounted in a first configuration and a second configuration. In the first configuration, the front plate is mounted to a wall structure such that the charging device is mounted to the wall structure. In the second configuration, the front plate and the top panel cooperate to enclose a gantry structure such that the charging device is mounted to the gantry structure.

In at least some examples, the modular mounting system comprises a bottom plate configured to cooperate with the front plate and the top panel to enclose the gantry structure when the modular mounting system is mounted in the second configuration.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 3A is a perspective view of the retractor of FIGS. 2A and 2B, according to an embodiment of the disclosure;

FIG. 3B is a side view of the retractor of FIGS. 2A and 2B, according to an embodiment of the disclosure;

FIG. 3C is a side view of the retractor of FIGS. 2A and 2B, illustrating the retractor partially disassembled, according to an embodiment of the disclosure;

FIG. 3D is a perspective view of a saddle for use with the retractor of FIGS. 2A and 2B, according to an embodiment of the disclosure;

FIG. 3E is a bottom view of the retractor of FIGS. 2A and 2B, according to an embodiment of the disclosure;

DETAILED DESCRIPTION

Figure 1:
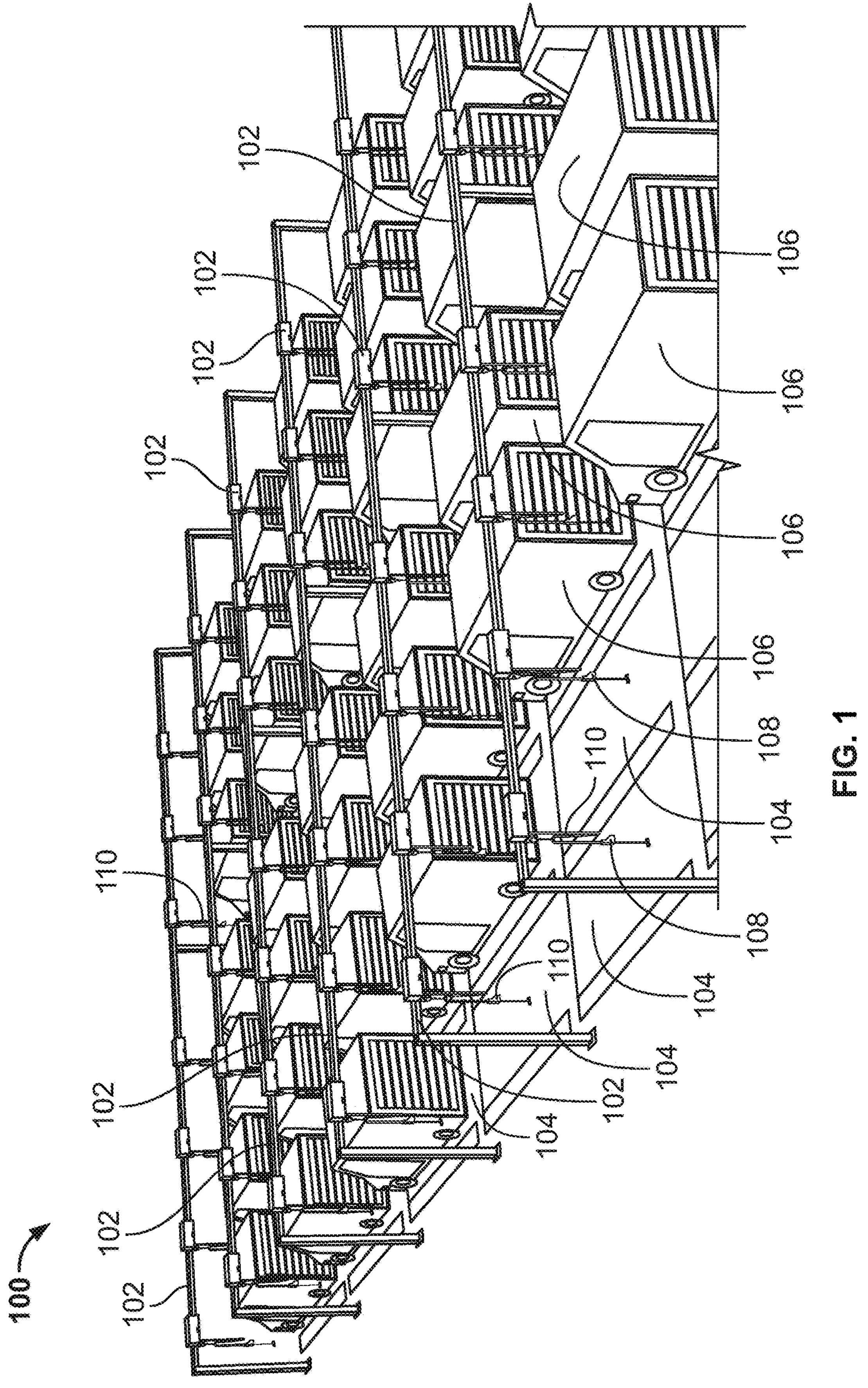
FIG. 1 is an illustrative diagram of a fleet charging environment or system, e.g., for a storage facility for a fleet of electric delivery vehicles, according to some embodiments of the disclosure.

Referring now to FIG. 1, a fleet charging environment or system 100 is illustrated. System 100 generally includes an overhead charging system comprising a plurality of gantry structures 102 extending across parking spaces 104 for corresponding delivery vehicles 106. The gantry structures 102 each include a purpose-built cable management solution to manage secure, reliable, and efficient operation of plugs or charge connectors 108 at an end of a charging cable 110 in relatively tight spaces, e.g., between vehicles. Accordingly, removal/plugging in of connectors 108 to vehicle charge ports is made relatively less difficult despite vehicles 106 being relatively closely positioned together. Each charging cable 110 may generally extend downward from the gantry structure 102 and may be configured to charge one of the vehicles 106. For example, the connectors 108 may be associated with each of the parking spaces 104 and may deliver current to the vehicles 106 from electrical charging devices 112 via one of the charging cables 110 when the vehicles 106 are parked or stored in the parking spaces 104. Each of the electrical charging devices 112 are mounted to one of the gantry structures 102, elevating the electrical charging devices 112 above the vehicles 106. Accordingly, the electrical charging devices 112 generally are positioned above drivers of the vehicles 106 as well as puddles or other ground-related potential electrical hazards. In the illustrated example, a single electrical charging device associated with each parking space 104, with the electrical charging device 112 having a single cable 110 extending to a single connector 108. However, other configurations are permitted, such as where multiple connectors 108 and/or cables 110 are associated with a single charging device 112 to provide current to multiple parking spaces 104/vehicles 106. The electrical charging devices 112 may be high-speed direct current (DC) chargers. The charging devices 112 may have any power output capability that is convenient for charging vehicles 106. In an example, the charging devices 112 are configured to deliver varying levels of power depending on charging needs for a vehicle 106 receiving current from the charging device 112, including a peak power of 160 kilowatts (kW). While the examples herein are generally directed to high-speed direct current (DC) charging systems, it should be understood that the examples herein may be equally applicable to alternating current or non-high-speed charging systems or components.

Generally, the examples herein leverage combined benefits of purpose-designed components and their integration into multiple configurable or modular systems that may be adapted for specific needs of a fleet operator, as will be described further below. As will be described further below, among other advantageous aspects the cable management systems of system 100 may generally provide:

1. charging cables 110 that have controlled movement and orientation in space;
2. user touchpoints benefitting from reduced load handling and less steps required for completing charging sessions;
3. extended lifespan of critical charging hardware components (for example, cables 110 and connectors 108);
4. a relatively small number of key systems that can support wide range of fleet charging use cases;
5. field-serviceable components, with easy access to modularized servicing touchpoints, minimizing disruption to the charging operation; and
6. mounting for the components on multiple types of overhead structures, including to purpose-built gantry systems, e.g., having one or more gantry structures 102, as well as existing ceiling/architecture of fleet charging facilities.

FIGS. 2A, 2B, and 3-9 generally illustrate various components of the system 100 illustrated in FIG. 1. The subsystems or components illustrated in FIGS. 2A, 2B, and 3-9 may also be employed in different charging systems for different electric vehicle hardware and/or charging use cases.

Figure 2A:
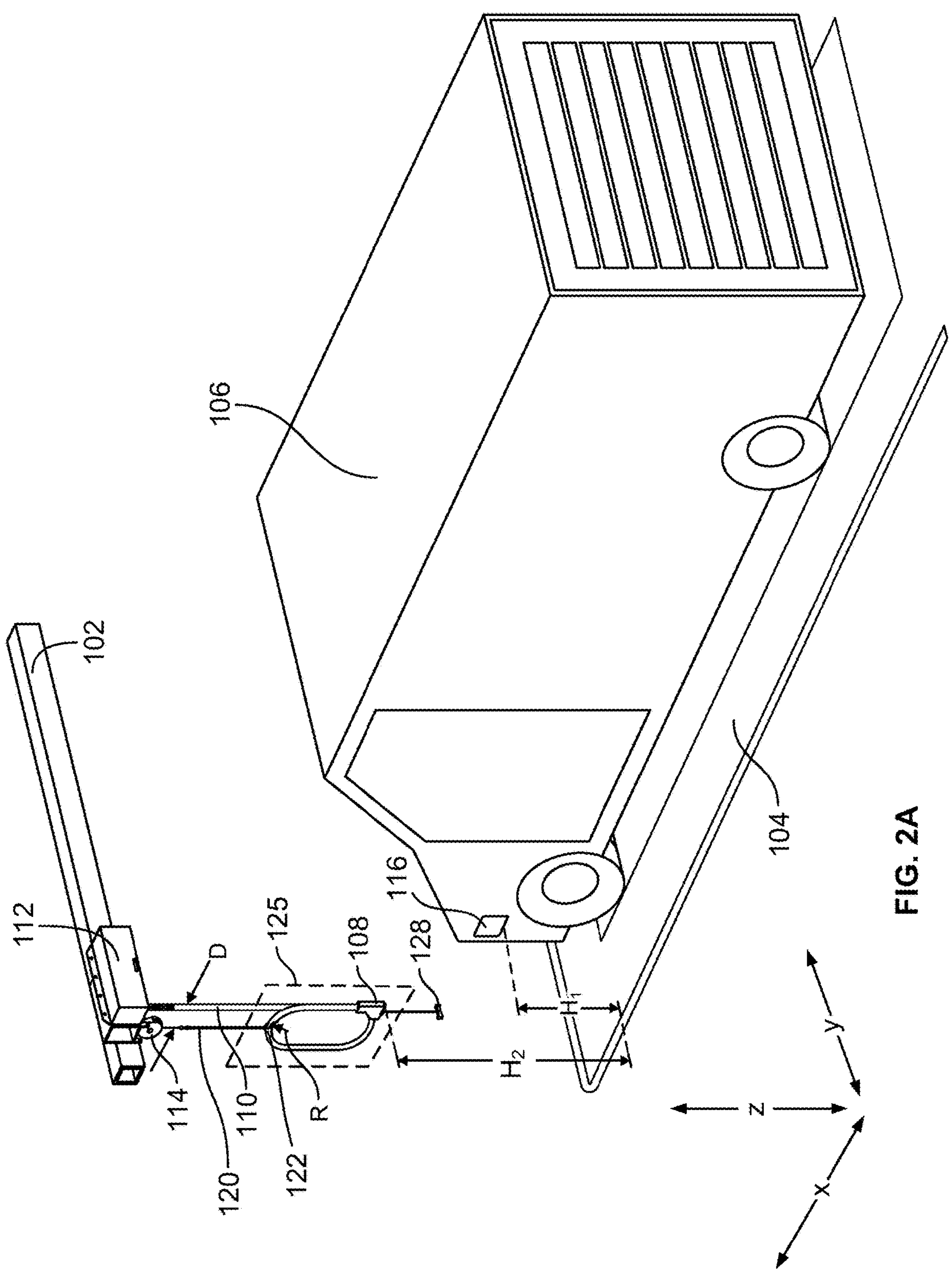
FIG. 2A is a perspective view of an example cable retractor for the system of FIG. 1, with the cable illustrated in a first position, according to some example approaches.
Figure 2B:
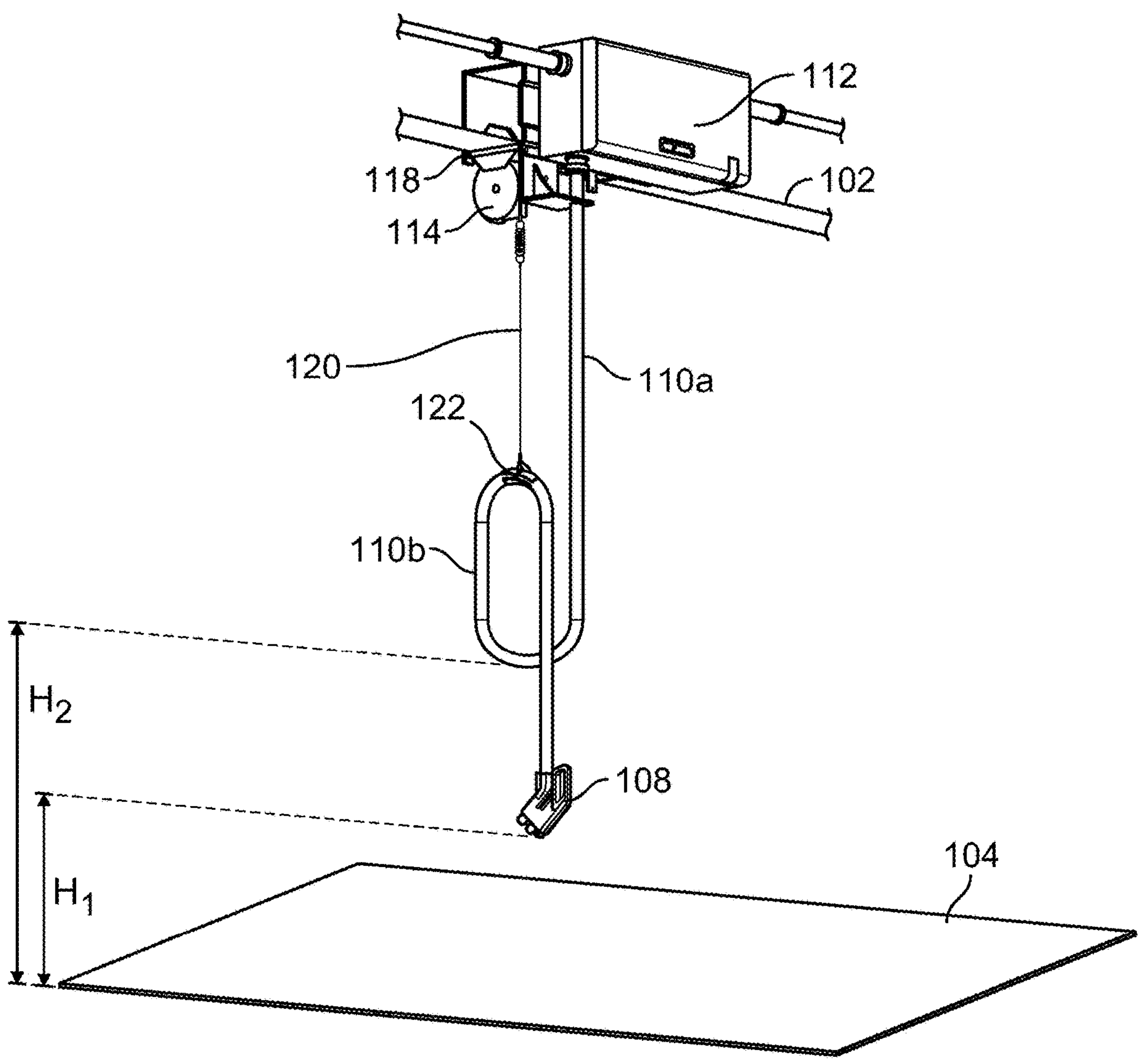
FIG. 2B is an enlarged view of the example retractor of FIG. 2A, with the cable illustrated in a second position that is relatively lowered, according to an example.

Turning now to FIGS. 2A, 2B, and 3, a first example subsystem directed to a cable retractor 114, e.g., for a charging cable 110 extending from charging device 112, is illustrated and described in further detail. Generally, the retractor 114 is configured to support the charging cable 110 at least at a relatively elevated position, e.g., for storage. The retractor 114 is also configured to support the charging cable 110 at a relatively lowered position, e.g., such that the charging cable 110 is positioned below the elevated position such as for charging a vehicle 106. For example, as shown in FIG. 2B at a lowered position the charging cable 110 may be extended relatively further below the charging device 112 such that the connector 108 is at a height $H_1$, in which the connector 108 is sufficiently close to the ground/parking space 104 that the connector 108 may be plugged into a charging location (e.g., charge port 116 of the vehicle 106 when parked in the parking space 104; see FIG. 2A). Alternatively, the retractor 114 may elevate the cable 110 to a position such that the connector 108 is relatively higher, e.g., at a height $H_2$, in which the connector 108 and the cable 110 are sufficiently high that drivers or other personnel using system 100 may walk beneath the connector 108 and/or cable 110. As seen in FIG. 2A, the cable 110 may be provided with a pull handle 128 to allow a driver or service personnel to reach the connector 108 and/or cable 110, and/or pull the connector 108 downward from the elevated/storage position, e.g., so that the connector 108 may be plugged into the vehicle 106/charge port 116.

Referring now to FIGS. 3A-E, the retractor 114 is illustrated and described in further detail. The retractor 114 may include a housing 115 and a base 118 configured to be secured to the gantry structure 102. The base 118 may have one or more mounting points, e.g., holes for receiving fasteners configured to secure the retractor 114 to the gantry structure 102. In an example, the base 118 defines a mount panel 119 or surface that engages the gantry structure 102. The mount panel 119 may be smaller than the gantry structure, such that the retractor 114 is generally covered by the gantry structure 102, e.g., to minimize exposure to outdoor elements, weather, etc., when mounted underneath the gantry structure 102. Accordingly, the base 118 is configured to be positioned above a charging location, e.g., a parking space 104.

The retractor 114 includes a retractable support cord 120, e.g., a paracord, extending from the base 118 to a saddle 122. The support cord 120 is configured to be spooled into/out of the housing 115 of the retractor 114. Accordingly, the support cord 120 generally may be extended downward, e.g., toward the charging location/parking space 104, and may also retract toward the base 118. The support cord 120 may thereby lower/raise the cable 110 and/or connector 108.

Generally, the retractor 114 facilitates use of the cable 110 for a vehicle charge port 116 within relatively small spaces, e.g., between parking spaces 104 and/or vehicles 106, and allows the cable 110 to be tucked away or stored when not in use. Charging cables 110 may be suspended/lowered via the support cord 120 or other support cable, paracord, or the like with a range of retraction forces that are rated for electric vehicle charging equipment load and ergonomic requirements of operators. Generally, to the extent a charging cable 110 is longer and/or heavier, it will require greater retraction forces than comparably shorter/lighter versions of the charging cable 110. In at least some examples, retraction forces may be between approximately 15 pounds and 30 pounds. Additionally, the support cord 120 can be "locked" from further extension and retraction at any extended length from the retractor housing 115, which as noted above may be mounted to the gantry structure 102 over the vehicle 106, improving ease of use of the cable 110 and support cord 120. In at least some examples, the support cord 120 may have a travel of no less then 8-10 feet, thereby providing effective reach of the charging cable 110.

A relatively wide-angled operation of extension and retraction of the support cord 120 may be facilitated by a cord routing opening 130 that extends across a relatively large proportion of the housing 115. In the example illustrated in FIG. 3E, the cord routing opening 130 extends through the entire lower half or hemisphere of the housing 115. A cord grommet 132 surrounding the opening 130 may also have a self-cleaning feature to deter rain, snow, and dust from intrusion into the housing 115, e.g., brush elements or the like.

The retractor 114 may include a ratchet brake 124 configured to position the saddle 122 at a plurality of positions between the base 118 and the charging location, e.g., one of the parking spaces 104. In an example, the ratchet brake 124 is configured to retract/deploy the support cord 120 from the housing 115 according to manually applied inputs from a driver or other service personnel. For example, the ratchet brake 124 may allow deployment/unspooling of the support cord 120 when handle 128 (see FIG. 2A) is pulled downward and may prevent retraction of the support cord 120 such that the saddle 122 remains at a desired vertical height. The driver/user may then apply a relatively hard/fast pull on the support cord 120 to disengage the ratchet brake 124, allowing a retraction mechanism to retract the support cord 120 into the housing 115, raising the cable 110 and/or connector 108, e.g., to an elevated or storage position.

In some examples, the retractor 114 may have a remote paracord retractor brake control. For example, operating touchpoints on the suspended charging cable 110 and/or connector 108 may allow deployment/retraction of the cable 110/connector 108. Additionally, a wireless connection, e.g., Bluetooth or the like, may allow control of a brake mechanism of the retractor 114, allowing stopping/locking of the support cord 120 in any extended length that is convenient. Further, an operator may remotely control the retractor 114 and release along any extended length of the support cord 120 using the remote/wireless control.

As noted above, example retractors 114 and/or support cords 120 may allow stop/release extension/retraction of the cable 110 and/or connector 108 anywhere across the entire length of the support cord 120. Example retractors may also provide sufficient load range and lengths suitable for example charging devices. In an example, a load range capacity and length of a support cord 120 is set to account for various factors, e.g., a clearance height of overhead beams, e.g., of the gantry structure 102, which can range from 12½ feet to 21 feet as an example, and weight of the suspended charging cable 110 that is needed to integrate the cable management systems and beams at the stated range of clearance height, e.g., to provide sufficient elevation of the connector 108 and/or cable 110. Example retractors 114 may also provide protection from outdoor elements, e.g., of components of the retractor 114, as may be beneficial in a commercial/fleet application where vehicles are stored/parked outdoors. Merely as one example, as noted above the mount panel 119 may be sized to be covered by gantry structure 102, and the cord grommet 132 may prevent dirt and/or moisture from being drawn into the housing 115, e.g., during retraction of the support cord 120.

As shown in FIG. 3D, the example retractor 114 also includes a saddle 122 for the charging cable 110. Generally, the saddle 122 may prolong a lifespan of the charging cable 110 by preventing excessive bending. For example, as illustrated the saddle 122 may have an upwardly-facing support surface 123 configured to carry a portion of the charge cable 110 (not shown in FIG. 3D), with the support surface defining a support radius R that is greater than, or at least no smaller than, a minimum bend radius of the charge cable 110 (i.e., as a measurement of the tightest turn or loop that may be formed with the cable 110 without damaging the cable 110 and/or components thereof). To the extent the cable 110 may define a thickness offsetting a centerline of the cable 110 from the support surface 123, it will be understood that the support radius R may in some cases be less than the minimum bend radius of the charge cable 110 by the offset amount, e.g., one half of a thickness of the cable 110. The saddle 122 allows for a tool-free removal of the charge cable 110 from the saddle 122 and may be formed of an impact-safe material, e.g., plastic or rubber, to prevent damage to vehicles 106 that might otherwise result from incidental contact.

As best seen in FIG. 2A, the charging cable 110 and support cord 120 coming out of a retractor 114 may be generally offset laterally (e.g., in a direction parallel to the x-axis) by a distance D that is at least as great as the minimum bend radius of the cable 110. The offset distance D may correspond to the support radius R of the saddle 122. This may minimize an overall footprint of the suspended charging cable 110 to the extent possible without damaging the cable 110 from the bending/looping arrangement, e.g., by bending or looping the cable 110 at a radius lower than the minimum bend radius.

The spacing of the charging cable 110 and support cord 120 may be aligned to minimize potential for interference of the cable 110 with the vehicle 106 and/or a driver or other service personnel. For example, as shown in FIG. 2A the support cord 120 and portion of the cable 110 hanging from the housing 115 are parallel and laterally or horizontally spaced apart. For example, as illustrated in FIG. 2A, the support cord 120 and portion of the cable 110 hanging from the housing 115 are spaced along the indicated x-axis. The support cord 120 of the saddle 122 may be spaced from the charging cable 110 such that charging cable 110 is looped to generally define a plane 125. The plane 125 may include any loops, e.g., helical loops, of the cable 110 that may be needed, depending on the length of the cable 110, reach between raised and lowered positions, etc. The spacing and the orientation of the charging cable 110 by the saddle 122 may generally keep the looped charging cable 110 oriented in the plane 125, thereby defining a planar space for the charging cable 110 in the suspended state. The plane 125 encompasses a planar space for the charging cable 110, which minimizes interference with the space needed for vehicle 106 and personnel traffic. Accordingly, the plane 125 is parallel or substantially so with respect to a direction of travel of the vehicle 106 through parking space 104, e.g., for charging. As a result, spread of the cable 110 across the width of the vehicles' parking space 104 is prevented, and the potential for vehicle-to-hanging charging cable 110 contact may be reduced.

Figure 4:
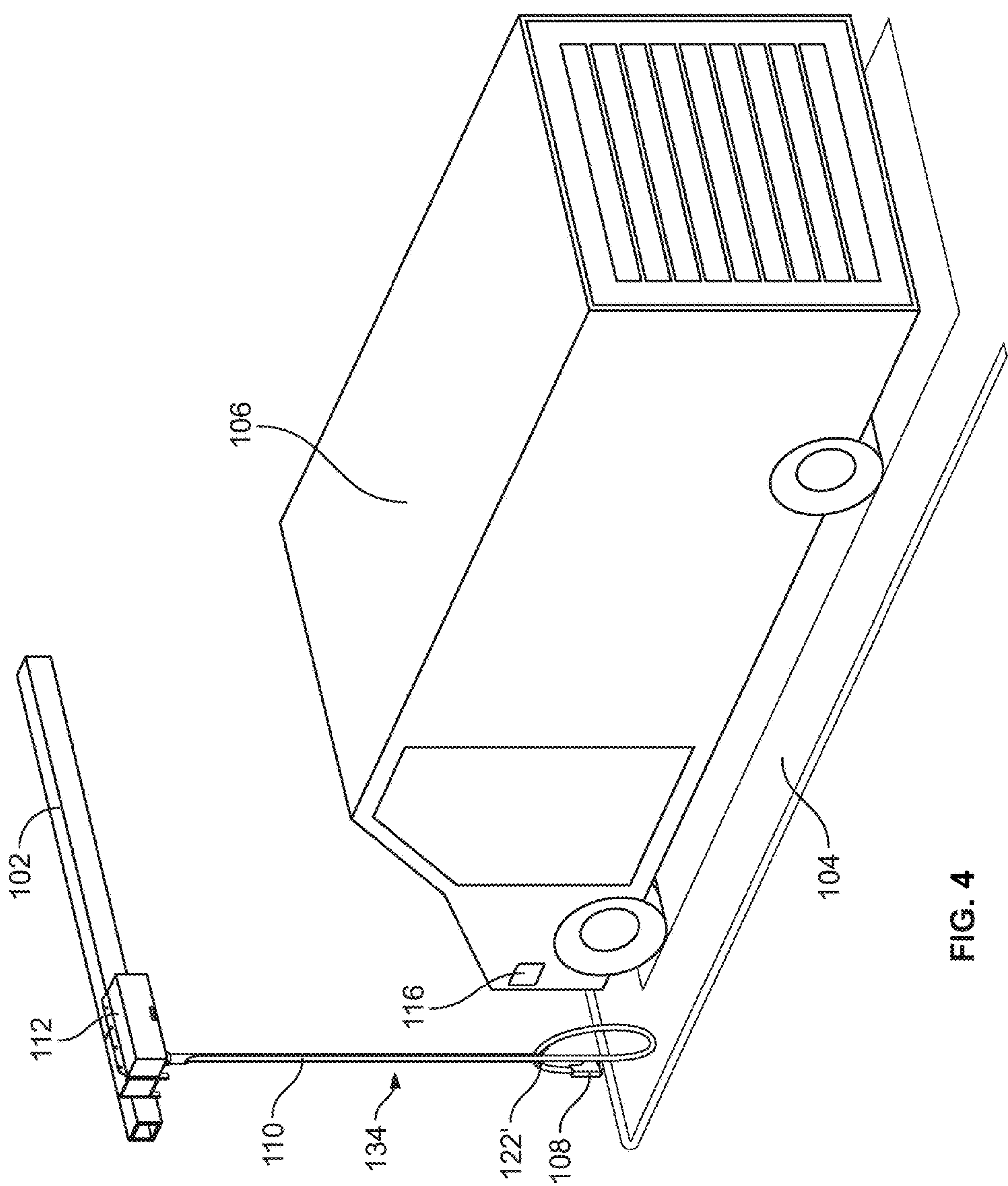
FIG. 4 is a perspective view of a cable stabilizer for the fleet charging system of FIG. 1, according to an embodiment of the disclosure.
Figure 5:
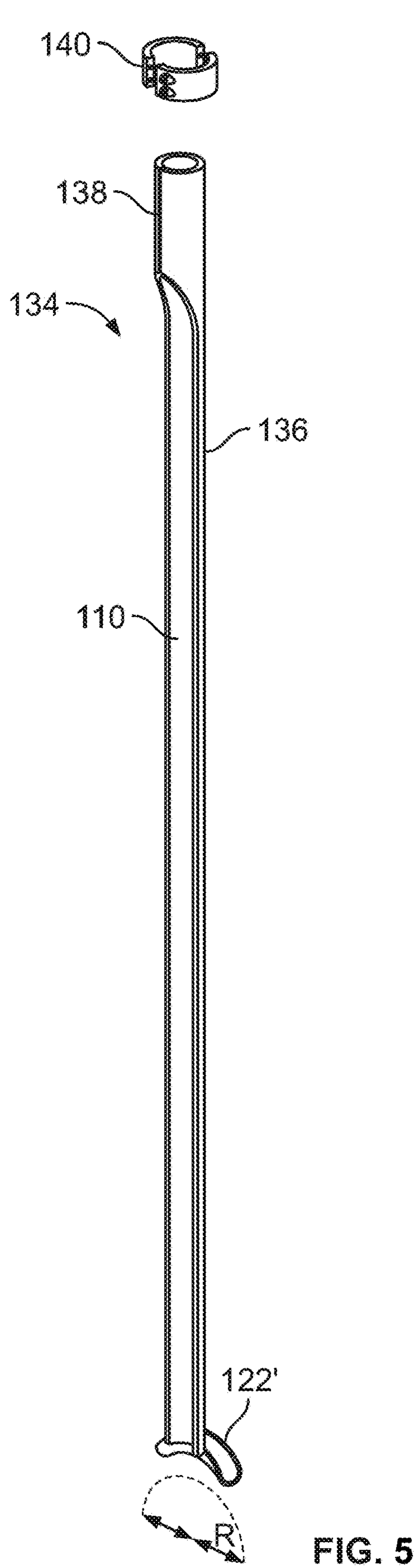
FIG. 5 is an enlarged perspective view of the cable stabilizer of FIG. 4, according to an embodiment of the disclosure.
Figure 6:
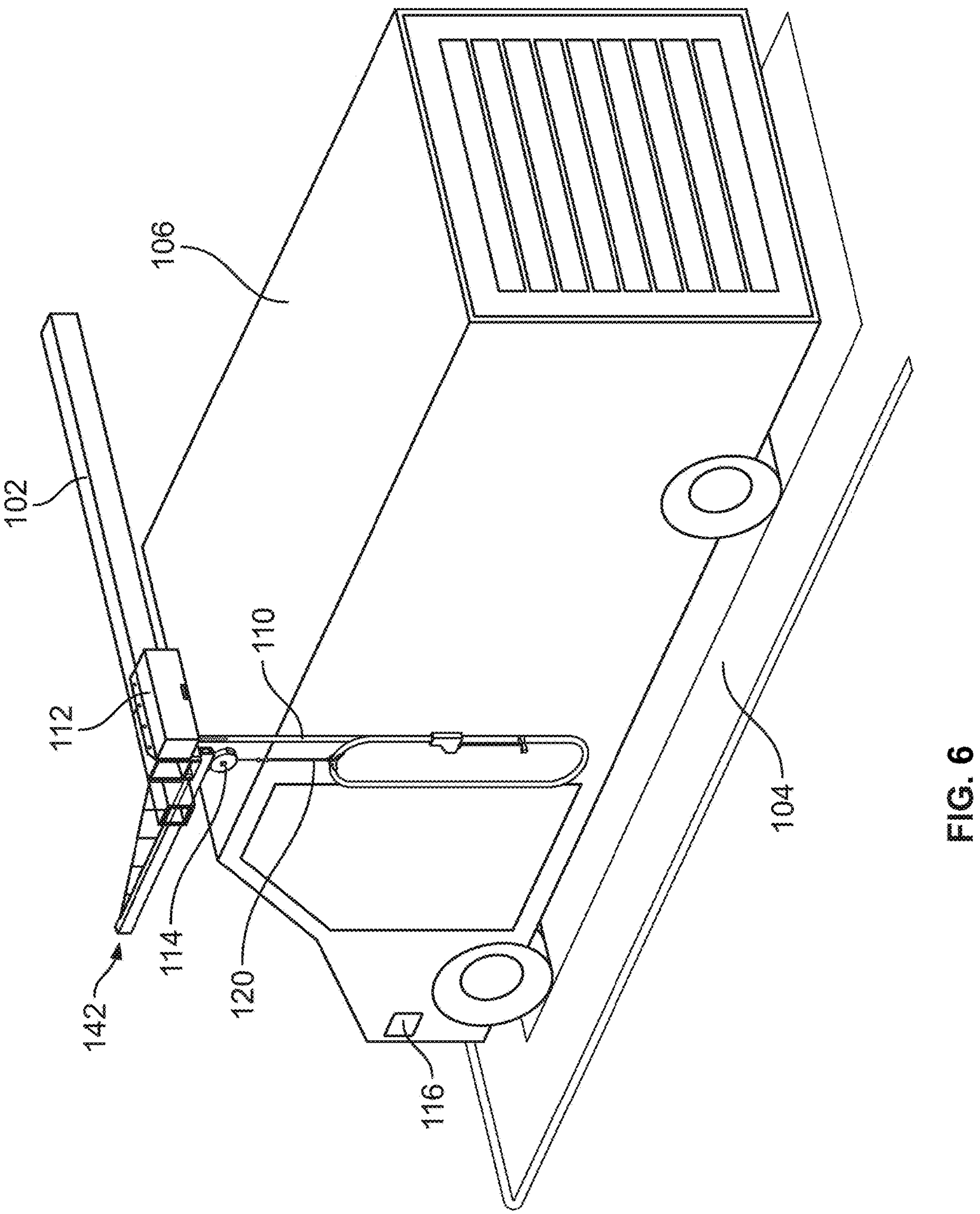
FIG. 6 is a perspective view of a track system for the fleet charging system of FIG. 1, according to an embodiment of the disclosure.

Referring now to FIGS. 4 and 5, another example subsystem for supporting a cable 110 from an electrical charging device 112, e.g., in the system 100, is illustrated and described in further detail. More specifically, a cable stabilizer 134 may be provided that extends downward from the charging device 112. The charging cable 110 may extend downward from the electrical charging device 112 within the cable stabilizer. The cable stabilizer 134 generally allows the cable 110 to hang downward from the elevated gantry structure 102 and/or the charging device 112. The cable stabilizer 134 generally provides lateral support to the charging cable 110, which may hang down from the charging device 112. In the example illustrated in FIGS. 4 and 5, stabilizer 134 comprises a tube-like structure, e.g., partial tube 136, at least partially extending about the cable 110 to protect the cable 110, e.g., to prevent the cable 110 from freely swinging due to wind, protect from impact with vehicle 106 and/or users, etc. The partial tube 136 may allow the cable 110 to be pulled away from or out of the stabilizer 134, e.g., as may be needed to allow the cable 110 to reach a charge port 116 of the vehicle 106, etc. The partial tube 136 may be formed of a somewhat compliant material such as rubber but may also have structure sufficient to protect the cable 110. In one example, wire elements extending through the rubber material may provide a degree of resistance or stiffness to protect the charge cable 110 within the partial tube 136. The partial tube 136 may allow access to the charging cable 110, e.g., with a "half-pipe" configuration that is open along a length of the charging cable 110. The partial tube 136 may allow the charging cable 110 to be securely suspended from the overhead-mounted charging device 112 and may also minimize footprint of the charge cable 110 when not in use. Additionally, the cable 110 may be kept above or off the ground when not in use, preventing the cable 110 and/or connector 108 from becoming a tripping hazard and reducing wear/tear to the charging cable 110 and/or connector 108.

As also illustrated in FIGS. 4 and 5, the stabilizer 134 may have a stationary saddle 122' provided at a lower end thereof. The stationary saddle 122' may generally be identical to the saddle 122 illustrated in FIG. 3D and described above but may be generally fixed in position relative to the charging device 112 and/or the gantry structure 102. More specifically, to the extent the stabilizer 134 and/or partial tube 136 are relatively "stiff," the saddle 122' may in some examples not be movable with respect to the charging device 112, gantry structure 102, or for that matter anything else from which the stabilizer 134 is suspended. Accordingly, the cable 110 may be looped in a plane to minimize lateral space of the cable 110, e.g., as described above in the example of FIGS. 2A, 2B, and 3.

The partial tube 136 may be secured to the charging device 112 in any manner convenient. As seen in FIG. 5, a fitting 140 may generally clamp the partial tube 136 to the charging device 112 (not shown in FIG. 5). At an upper end of the partial tube 136, a slip sleeve 138 may be provided which allows the cable 110 to be inserted laterally into the partial tube 136. For example, a resilient material of the partial tube 136 adjacent a slit in the upper end of the partial tube 136 may deflect to allow the cable 110 to be inserted into the partial tube 136, thereby eliminating any need to remove the cable 110 from the charging device 112.

Turning now to FIGS. 6 and 7A-7C, another cable storage subsystem is illustrated and described in further detail. More specifically, the illustrated subsystem is directed to a track and trolley arrangement that is mounted onto the gantry structure 102 above the vehicle(s) 106 and/or parking space(s) 104.

A retractor 114, e.g., as described above and shown in FIGS. 2A, 2B, and 3, is provided that is moveable along a track 142 supported by the gantry structure 102, thereby increasing reach of the support cord 120 and/or the charging cable 110. The track 142 is shown extending at a right angle with respect to the gantry structure 102, such that the retractor 114 may be moved longitudinally (i.e., front-to-back or vice-versa) with respect to a vehicle 106. The example illustrated in FIGS. 6 and 7A-7C may maintain efficient use of space by the charging cable 110 with semi-automated features. Additionally, user operation is improved, and a need for operators' involvement with active cable management is reduced.

As noted above, in some examples a retractor 114 may include a support cord 120, retractor 114, a remote retractor control, and a saddle 122, e.g., as described above and illustrated in FIGS. 2A, 2B, and 3A-E. The track/trolley system of FIGS. 6 and 7A-7C may be optionally provided in addition, thereby expanding reach of the charge cable 110, e.g., to a vehicle charge port 116 (see FIG. 6).

Figures 7A, 7B, 7C:
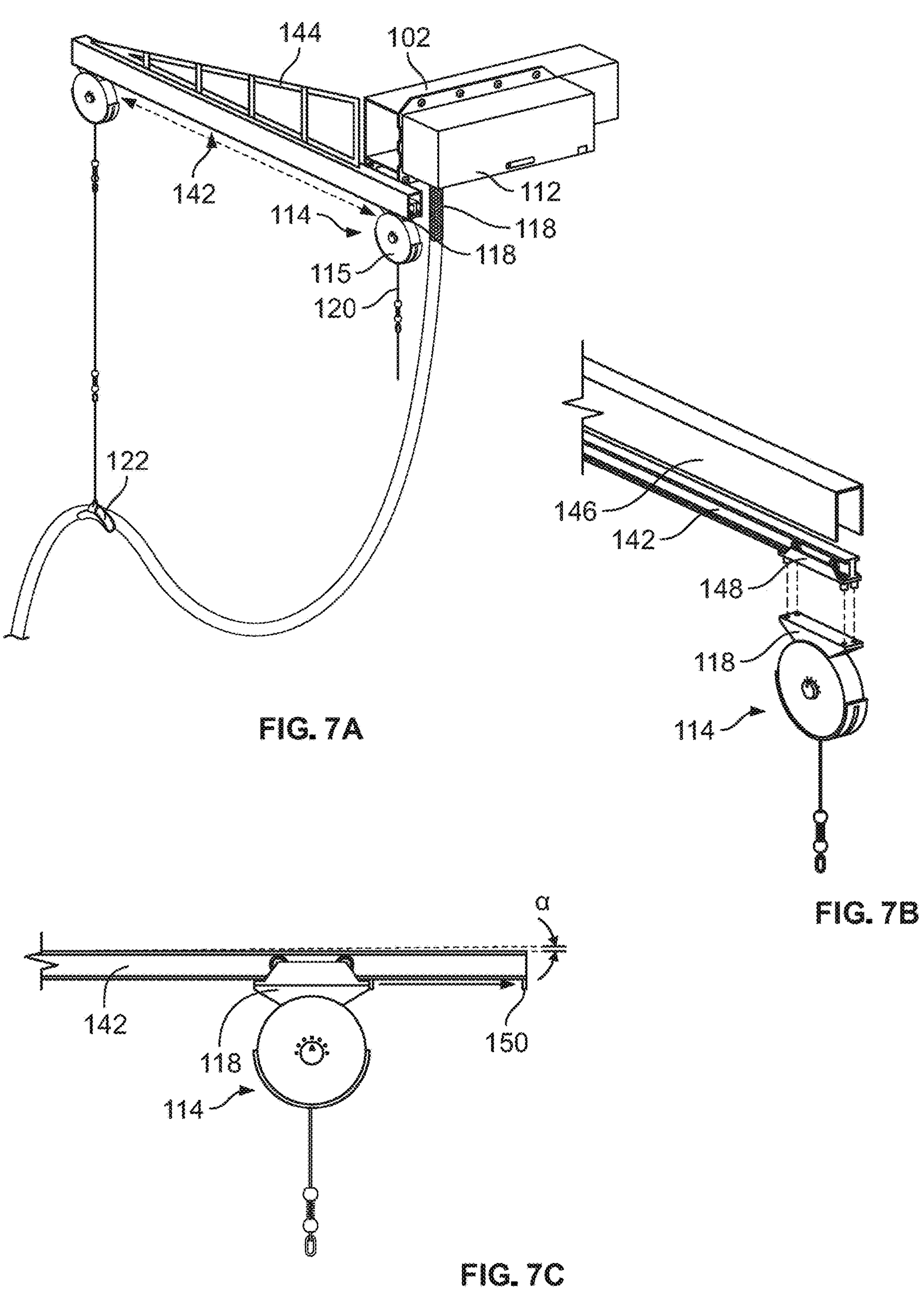
FIG. 7A is an enlarged perspective view of the track system of FIG. 6, according to an embodiment of the disclosure.
FIG. 7B is an assembly view of the track system of FIG. 7A, according to an embodiment of the disclosure.
FIG. 7C is a side view of the track system of FIG. 7A, according to an embodiment of the disclosure.

The track 142 may include a track support structure 144 extending from the gantry structure 102. The track support structure 144 generally supports the track 142 within a guard 146. A trolley 148 carries the base 118 of the retractor 114. The trolley 148 may include wheels or any other mechanism convenient for facilitating movement of the retractor 114 and/or base 118 along the track 142. Merely as another example, the trolley 148 may slide along the track 142. The guard 146 may generally protect the trolley 148 and may also prevent the trolley 148 from becoming dislodged from the track 142. As shown in FIG. 7C, the track 142 may define an angle $\alpha$ relative to horizontal, such that gravity biases the trolley toward one end of the track 142. In the example illustrated, the trolley 148 generally rests at an end of the track 142 adjacent the charging device 112 and/or gantry structure 102. Further, a magnet 150, a detent, or other retention device may be provided to maintain the trolley 148 in a stationary position on the track 142, absent a user pulling the retractor 114 and/or trolley 148 away from that position.

Referring now to FIGS. 8A-8D and 9A-9C, an example modular mounting system 152 that may be employed to mount charging device 112 and/or cable 110, e.g., above a vehicle 106, is illustrated and described in further detail. The mounting system 152 may mount a charging device 112 having a cable 110 to a gantry structure 102, with the cable 110 extending downward from an overhead position, e.g., as in any of the arrangements described above such as with a retractor 114, cable stabilizer 134, and/or track 142 and accompanying trolley 148.

Figure 8A:
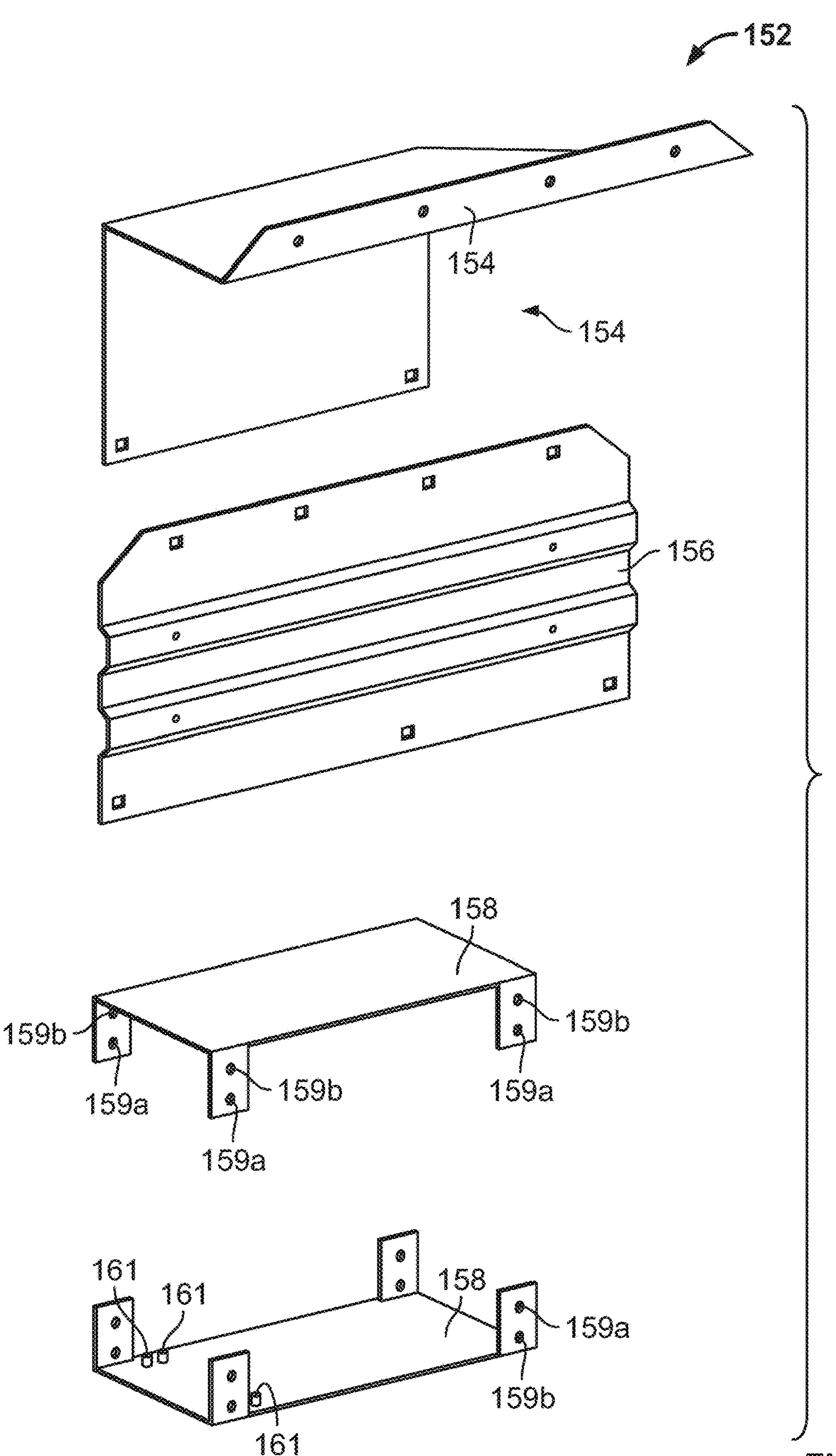
FIG. 8A is an exploded or assembly view of a mounting system, e.g., for the fleet charging system of FIG. 1, according to an embodiment of the disclosure.
Figure 8B:
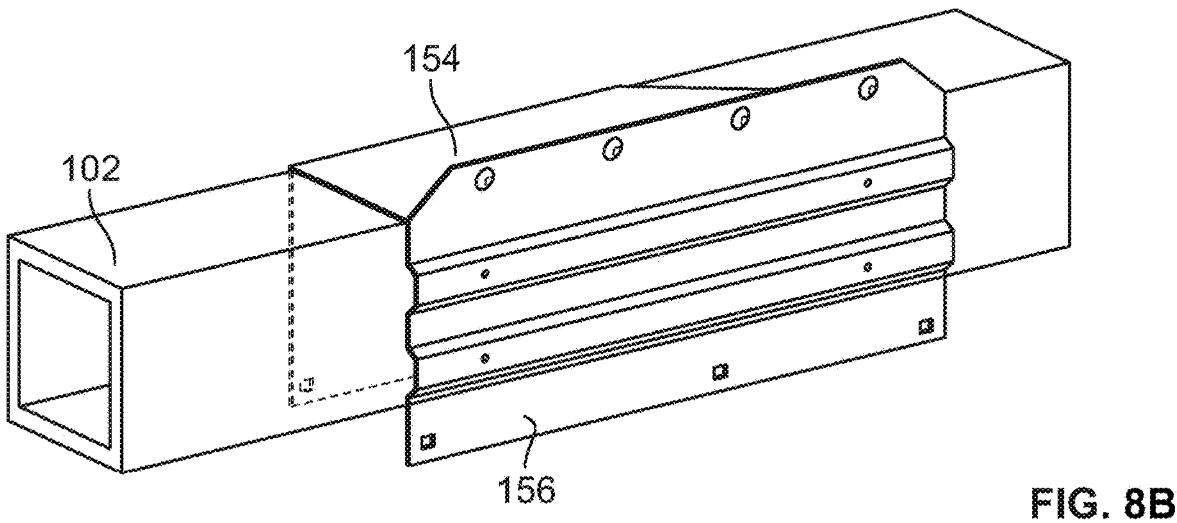
FIG. 8B is a perspective view of a front plate and top panel of the mounting system of FIG. 8A assembled to a gantry structure, according to an embodiment of the disclosure.
Figure 8C:
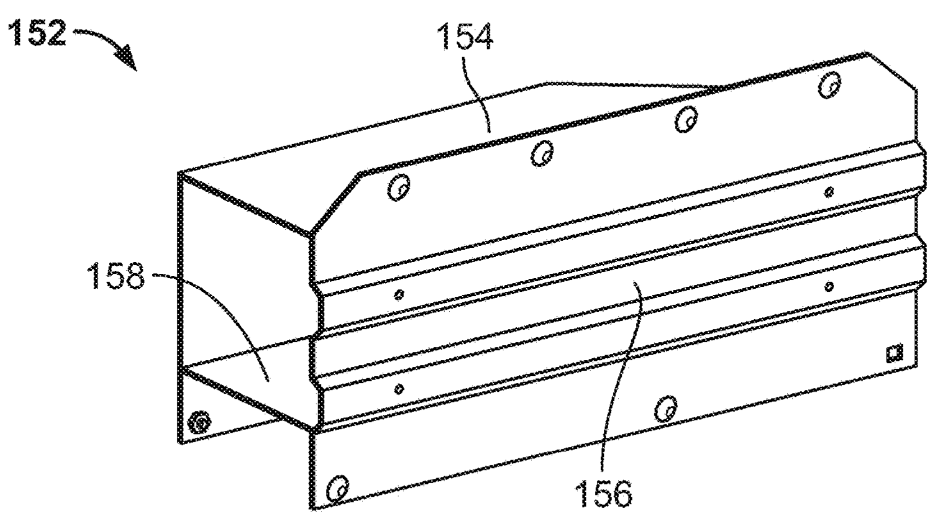
FIG. 8C is a perspective view of the mounting system of FIGS. 8A and 8B assembled in a first arrangement with a relatively reduced interior dimension, according to an embodiment of the disclosure.
Figure 8C:
Figure 8D:
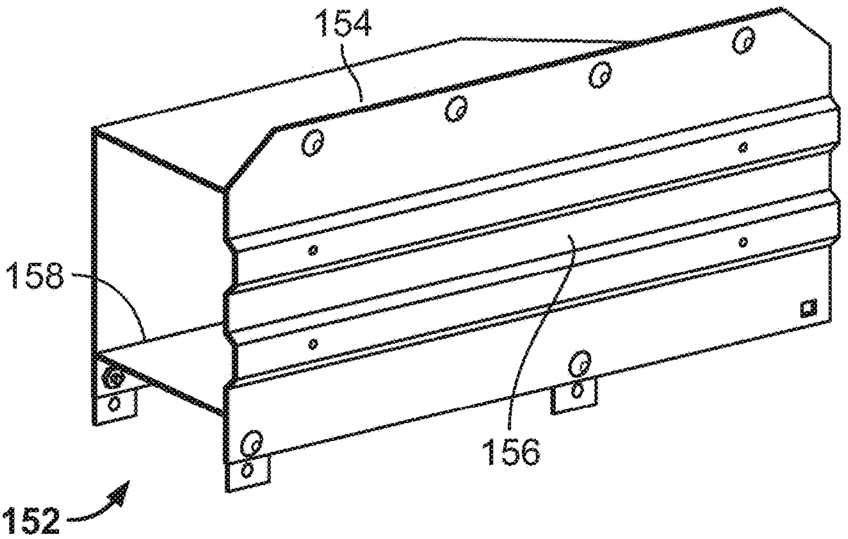
FIG. 8D is a perspective view of the mounting system of FIGS. 8A and 8B assembled in a second arrangement with a relatively increased interior dimension, according to an embodiment of the disclosure.

Referring now to FIG. 8A, example mounting system 152 is illustrated in an exploded view. The mounting system 152 may include, as illustrated three primary or main components: a top panel 154, a front plate 156, and a bottom plate 158 (FIG. 8A illustrates the bottom plate 158 in two different orientations, with the upper orientation of the bottom plate 158 being flipped vertically with respect to the lower orientation, and vice versa). The top panel 154 and front plate 156 may be assembled and "hung" over a beam, e.g., of the example gantry structures 102 described above, as illustrated in FIG. 8B. The bottom plate 158 may be secured to the top panel 154/front plate 156 to enclose the gantry structure 102. The mounting system 152 may be configured to enclose various size/shape gantry structures 102. For example, the bottom plate 158 may have multiple mounting apertures 159*a* and 159*b* (collectively, 159) to different interior heights of the assembled mounting system 152. More specifically, in a first arrangement illustrated in FIG. 8C, the bottom plate 158 defines a relatively smaller interior height (e.g., 10 inches) with the bottom plate 158 secured to the top panel 154 and front plate 156 with mounting apertures 159*a*. In a second arrangement illustrated in FIG. 8D, the bottom plate 158 defines a relatively larger interior height (e.g., 12 inches) with the bottom plate 158 secured to the top panel 154 and front plate 156 with mounting apertures 159*b*. Accordingly, the mounting system 152 may be mounted to a variety of different gantry structures 102 using the enclosed configuration illustrated in FIGS. 8C and 8D. The bottom plate may have a plurality of mounting studs 161, e.g., to facilitate assembly of different cable management system(s) and/or different locations for mounting supports for cable 110 (not shown in FIGS. 8A-8D).

Figures 9A, 9B, 9C:
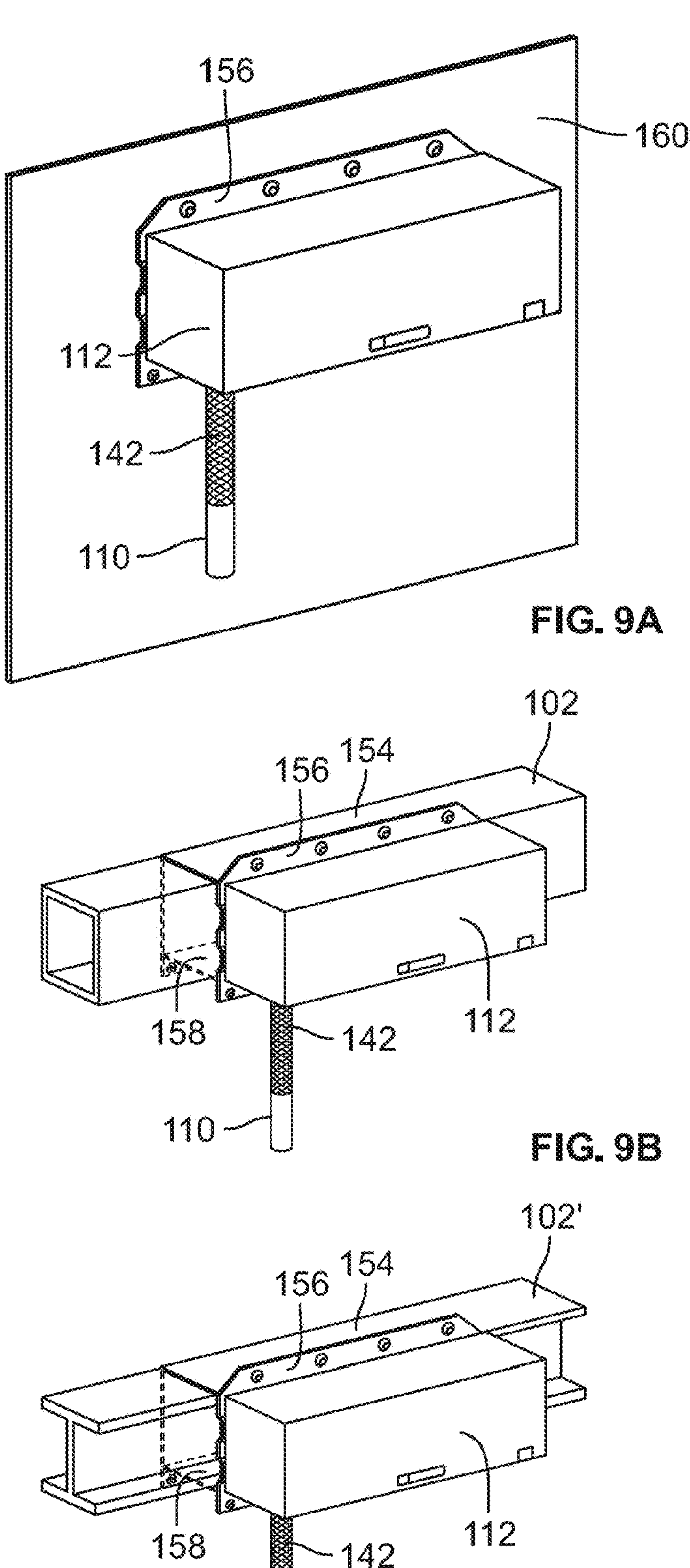
FIG. 9A is a perspective view of the mounting system of FIGS. 8A-8D mounted to a wall structure, according to an embodiment of the disclosure.
FIG. 9B is a perspective view of the mounting system of FIGS. 8A-8D mounted to a gantry structure, according to an embodiment of the disclosure.
FIG. 9C is a perspective view of the mounting system of FIGS. 8A-8D mounted to another gantry structure, according to an embodiment of the disclosure.

The mounting system 152 may also be used to secure a charging device 112 to elevated structures other than the gantry structure 102. For example, as illustrated in FIG. 9A one side of the front plate 156 may be secured to a wall structure 160, with the charging device 112 mounted to the other side of front plate 156. Accordingly, the mounting system 152 is configured be used in a variety of different configurations to mount charging device 112 in an elevated position. As noted above, in a first configuration the front plate 156 may be mounted to wall structure 160 to support mounting of the charging device 112, as illustrated in FIG. 9A. In a second configuration, the front plate 156 and top panel 154 may cooperate to enclose gantry structure 102, as illustrated in FIG. 9B, with the bottom plate 158 enclosing the gantry structure 102. Other configurations are possible. For example, to the extent the bottom plate 158 is not needed to securely mount the charging device 112, the front plate 156 and the top panel 154 may be assembled and hung upon gantry structure 102. Furthermore, the mounting system 152 may be secured to different types of elevated gantry structures 102. In FIG. 9B, the mounting system 152 is illustrated mounted to a gantry structure 102 comprising a beam having a generally square cross-section. In FIG. 9C, the mounting system 152 is secured to a gantry structure 102' comprising a beam having a generally I-shaped cross-section.

Generally, the mounting system 152 conceals or hides visual clutter of charging accessories that are mounted on the overhead structures, e.g., gantry structure 102. Lifespan of mounted charging accessories, e.g., charging device 112, may also be improved via protection from mechanical impact and natural elements. The mounting system 152 may also function as an information display board, to the extent the mounted charging device 112 includes displays or other indicators that are visible with the charging device 112 mounted.

In some examples, the mounting system 152 provides a structure for a charger (e.g., any electric vehicle supply equipment (EVSE)) and associated cable management hardware, e.g., a retractor 114, cable stabilizer 134, track 142/trolley 148 arrangement, or the like. The mounting system 152 may have built-in attachment points, which creates optimal hardware integration needed for cable management. The generally modular configuration of the three components of the mounting system 152 generally facilitates servicing and updates to the cable management accessories. For example, serviced/updated components may be utilized with the remaining/non-serviced components, e.g., where bottom plate 158 becomes damaged, it may be removed and a new bottom plate 158 may be installed with the existing front plate 156 and top panel 154.

The mounting system 152 may generally prevent load travel, e.g., from the weight of the suspended cable 110 and its pull into the main charging device 112 mounted above. Accordingly, rubbing and/or sliding at an interface between the cable 110 and the charging device 112 may be reduced or eliminated. Accordingly, overall lifespan of the charging device 112, cable 110, connector 108, etc. are increased to the extent wear is reduced. In at least some examples, the mounting system 152 may allow a strain relief device to be mounted to the mounting system 152 or to the charging device 112 to reduce strain applied to the charging cable 110, e.g., as a result of the charging cable 110 being suspended, from manipulation by a user, etc. Merely as one example, a strain relief 142 (e.g., a wire mesh strain relief or Kellems grip) is illustrated in FIGS. 9A-9C, which is secured to the charging device 112. In other example charging devices 112 where a strain relief device for the charging cable 110 is not already included, example strain relief devices supporting the charging cable 110 may be mounted to the mounting system 152 instead of the charging device 112. Supporting the strain relief device 142 from the mounting system 152 in such approaches may minimize load or wear on the an enclosure of the charging device 112, particularly for applications involving repeated bend cycles and/or heavy usage.

As noted above, the charging device 112 may be any that is convenient. The mounting system 152 may generally provide a flexible installation solution for various third-party charging units, to the extent additional mounting positions may be defined by the front plate 156 or other components of the mounting system 152. The mounting system 152 may also add fleet-use readiness to existing charging systems by providing structural reinforcement, added flexibility for conductor routing, and integration with other cable management components. Accordingly, the mounting system 152 may generally be used with any form factor for a charging device.

Using the above-described mounting and cable arrangements for charging devices, integration of charging systems in a fleet application, e.g., as illustrated in FIG. 1, may be executed according to pre-established design rules. As elaborated further below, these guidelines are configured to optimize reach flexibility, use efficiency, reduction of potential hazards to users, and hardware lifespan. For example, multiple systems/components described herein may be combined to achieve desired site planning, for example, based on parking, gantry clearance, and vehicle fleet needs. Accordingly, an overall system such as system 100 illustrated in FIG. 1 may be generated based on desired use cases or requirements.

Merely as examples, benefits that are facilitated by the example illustrations herein include improved ease of operation, relatively controlled cable movement and orientation in space, efficient use of space by the cable, and an improved component lifespan. The example illustrations also provide a configurable cable management system that optimizes meeting fleet operator requirements and specific needs of their operations and business. Modularized cable management systems and components herein can also easily scale with evolving fleet charging needs. The examples herein may also provide consistent fleet charging hardware management for the lifespan of a fleet charging operation. The examples herein may also provide cost-efficient solutions to implementing an elevated or overhead fleet charging system.

Additionally, example components and their associated systems are designed specifically to work optimally with charging hardware and with any pre-existing structures, e.g., already located at a fleet location. Standardized components and their integration may also reduce or remove complexities involved in planning, installation, and hardware maintenance. Modularity and consistent integration points can also lower costs and time barriers to servicing in the field and allow scaling up or down as needed. Further, the integration of example systems facilitates reduced hazards to operators and service personnel.

The integration guidelines herein and illustrated in the drawings may also expedite design and installation of a fleet depot or system. Total costs of operations may be reduced via reductions in down-time and scalable hardware options. The integrated system of chargers and cable management may also provide higher reliability and reduction of hazards, e.g., due to wear on charging cables 110, charging device 112, or other components.

Example specifications for integration of charging components may combine various parameters or dimensions discussed herein. In one example approach for an integration of components, system 100 includes charging connectors 108 that are stored at a minimum height above the ground to create substantial head clearance, e.g., 80" above a ground surface. Additionally, the charging cable 110 and support cord 120 coming out of a retractor 114 are offset at a distance that matches the minimum "bend-guard" or support radius R on the saddle 122 (e.g., as shown in FIGS. 2A, 2B, 3, and 6), thereby minimizing a footprint of the suspended charging cable 110 without damaging the cable 110 from the bending/looping arrangement. Further, in this example the cable 110 and support cord 120 are aligned on a same axis or laterally spaced apart (e.g., with respect to the x-axis shown in FIG. 2A), thereby keeping the charging cable 110 oriented within a plane 125 and associated planar space in their suspended state and reducing interference to the space needed for vehicle 106 and personnel traffic (i.e., by preventing spread of the cable 110 across the width of the parking space 104). The load capacity of the retractors 114 in this example may also be adjusted or calibrated so that no more than 5 pounds (lbs.) of pull-down force is needed for operation. Vehicle charge ports of this example may also be installed between a height range of 2¾ feet to 4 feet (i.e., above the relevant ground surface), facilitating relatively easy and efficient reach and operation by a user. Further, user operation touchpoints are kept between a height above ground surface of 2¾ feet to 5 feet to enable operation of example systems and components for smaller users, e.g., a 5$^{th}$ percentile-size female, users under 5 feet tall, etc. Additionally, relatively higher reach operations associated with the system or components thereof will generally not require users to lift their elbows above shoulder height.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A charging system, comprising:
- a gantry structure;
- a plurality of electrical charging devices mounted to the gantry structure, each of the electrical charging devices having a charging cable extending downward from the gantry structure, each charging cable configured to charge a vehicle; and
- a saddle configured to support one of the charging cables below one of the electrical charging devices, wherein:
  - the saddle defines a support surface for the one charging cable, the support surface having a support radius greater than a minimum bend radius of the one charging cable; and
  - a support cord, configured to move the saddle vertically, is laterally spaced from the one charging cable such that the one charging cable is looped to define a plane.

2. The charging system of claim 1, further comprising a retractor configured to support the saddle at an elevated position and a lowered position, wherein the one charging cable is positioned for charging one of the vehicles at the lowered position.

3. The charging system of claim 2, further comprising a track extending from the gantry structure, wherein the retractor is configured to move along the track.

4. The charging system of claim 3, wherein the track is angled relative to a horizontal direction, such that the retractor is biased toward an end of the track.

5. The charging system of claim 3, wherein the track extends laterally from the gantry structure in a direction parallel to a vehicle movement direction through a charging area of the one of the electrical charging devices.

6. The charging system of claim 1, further comprising a cable stabilizer mounted to one of the electrical charging devices, the charging cable of the one electrical charging device extending downward from the one electrical charging device within the cable stabilizer.

7. The charging system of claim 6, wherein the cable stabilizer includes a partial tube laterally supporting the charging cable of the one electrical charging device below the one electrical charging device.

8. The charging system of claim 1, wherein the plane is aligned parallel to a vehicle movement direction through a charging area of the one electrical charging device.

9. The charging system of claim 1, further comprising a mounting system securing one of the electrical charging devices to the gantry structure, wherein the mounting system comprises a front plate further configured to be mounted to a wall structure for securing one of the electrical charging devices to the wall structure.

10. The charging system of claim 9, wherein the mounting system comprises a plurality of modular components.

11. The charging system of claim 1, wherein the plurality of electrical charging devices are each configured to supply a direct current via a respective one of the charging cables.

12. A charging system, comprising:
- a gantry structure;
- an electrical charging device mounted to the gantry structure;
- a charging cable extending downward from the gantry structure, the charging cable configured to charge a vehicle;
- a retractor configured to support the charging cable at an elevated position and a lowered position, wherein the charging cable is positioned for charging the vehicle at the lowered position; and
- a saddle configured to support the charging cable below the electrical charging device, wherein:
  - the retractor is configured to raise and lower the saddle,
  - the saddle defines a support surface for the charging cable having a support radius greater than a minimum bend radius of the charging cable, and
  - a support cord of the saddle is laterally spaced from the charging cable such that the charging cable is looped to define a plane.

13. The charging system of claim 12, wherein the plane is aligned parallel to a vehicle movement direction through a charging area of the electrical charging device.

14. The charging system of claim 12, further comprising a track extending from the gantry structure, wherein the retractor is configured to move along the track.

15. The charging system of claim 14, wherein the track is angled relative to a horizontal direction, such that the retractor is biased toward an end of the track.

16. The charging system of claim 15, wherein the track extends laterally from the gantry structure in a direction parallel to a vehicle movement direction through a charging area of the one of the electrical charging devices.

17. The charging system of claim 12, further comprising a mounting system securing the electrical charging devices to the gantry structure, wherein the mounting system comprises a front plate further configured to be mounted to a wall structure for alternatively mounting the electrical charging device to the wall structure.

18. The charging system of claim 17, wherein the mounting system comprises a plurality of modular components.

19. A charging system, comprising:

a gantry structure;

an electrical charging device mounted to the gantry structure;

a charging cable extending downward from the gantry structure, the charging cable configured to charge a vehicle;

a cable stabilizer, the charging cable extending downward from the electrical charging device within the cable stabilizer; and a stationary saddle configured to support the charging cable below the electrical charging device, wherein:

the stationary saddle defines a support surface for the charging cable having a support radius greater than a minimum bend radius of the charging cable, and the stationary saddle is laterally spaced from the charging cable such that the charging cable is looped to define a plane.

20. The charging system of claim 19, wherein the plane is aligned parallel to a vehicle movement direction through a charging area of the electrical charging device.

* * * * *